United States Patent [19]

Saito et al.

[11] 4,223,448
[45] Sep. 23, 1980

[54] DEHYDRATION AND INCINERATION OF SAMPLE MATERIAL

[75] Inventors: Tomo Saito, Sagamihara; Yumiko Nishiyama, Hatano; Kazuo Watanabe, Yokohama; Naotake Morikawa, Tokyo, all of Japan

[73] Assignee: Sagami Chemical Research Center, Tokyo, Japan

[21] Appl. No.: 840,441

[22] Filed: Oct. 7, 1977

[30] Foreign Application Priority Data

Oct. 7, 1976 [JP] Japan ............................ 51/119870
Aug. 4, 1977 [JP] Japan ............................ 52/92961

[51] Int. Cl.² ........................ F26B 3/30; F26B 3/34
[52] U.S. Cl. ............................... 34/4; 34/12; 34/92
[58] Field of Search ........................ 34/4, 92, 12

[56] References Cited

U.S. PATENT DOCUMENTS

| 2,905,117 | 10/1959 | Parkinson et al. | 34/92 X |
| 3,997,388 | 12/1976 | Simon | 34/4 |
| 4,057,907 | 11/1977 | Rapino | 34/4 |
| 4,103,431 | 8/1978 | Levinson | 34/4 |

Primary Examiner—John J. Camby
Attorney, Agent, or Firm—Sughrue, Rothwell, Mion, Zinn and Macpeak

[57] ABSTRACT

A sample material to be dehydrated is enclosed in a container transmissive to microwave and air is past through the container under a microwave radiation to preferentially remove the water content of the sample. The dehydrated sample may be incinerated by switching the air supply to an oxygen supply under the microwave radiation.

27 Claims, 15 Drawing Figures

DEHYDRATION AND INCINERATION OF SAMPLE MATERIAL

BACKGROUND OF THE INVENTION

This invention relates to a sample dehydration method and apparatus, and more particularly to a sample dehydration method utilizing microwave radiation and an apparatus for practicing the method, and the present invention relates further to an incineration method of a dehydrated sample and an apparatus for performing the same.

Heretofore, a hot-air drying method is extensively employed for drying samples. It is admitted in the art that this method is superior to other methods, such as, for instance, an infrared ray drying method, in the case where it is required to relatively quickly dry samples.

In the hot-air drying method, as is well known in the art, heat energy is applied to only the surface of a sample to be dried, or to be dehydrated. Therefore, the drying time depends on the surface area of the sample, and, accordingly, it takes a relatively long time to dry a sample having a relatively small suface area and low thermal conductivity. In the case where the heat energy applied to the surface area is increased to shorten the time required for drying the sample, a large amount of decomposition gas is produced from the sample, especially when the sample is of an organic material, and therefore a problem of stink takes place, and the sample itself may be destroyed.

For instance, at present, a number of experiment animals are used for a variety of purposes. The used animals, in general, are treated by burning them or burying them in the ground. However, such treatment cannot be allowed in the case where experiment animals have been employed for radioactive experiments. As is well known in the art, the most significant reason for the difficulty encountered in the final treatment of radioactive waste of animals resides in preservation method thereof. Since the waste of animals is liable to be decomposed, the decomposition thereof must be prevented until they are transferred to an authority who takes care of the final treatment thereof. For this purpose, in general, such waste of animals have been preserved by using preservatives such as, for instance, formalin. However, if this method is employed, it will be considerably difficult for the authority to treat them or to burn them, for instance.

Accordingly, the aforementioned troubles will never be caused if the waste of animals can be preserved without using preservatives which usually cause the precessings of the waste of animals to be difficult.

In order to meet this requirement, a method of drying waste of animals can be thought of. However, as was described, the hot-air drying method is disadvantageous in time and decomposition gas. Accordingly, it is very difficult to employ the hot-air drying method. A refrigeration drying method has been also employed to sufficiently dehydrate samples. However, the operations involved in this method are rather troublesome, which is disadvantageous in the point of economical view and in labor saving. Therefore, an effective drying method has been highly desired in various fields including the above mentioned case.

Further, it has been well known that organic sample material possibly containing inorganic substances is sometimes required to be tested for chemical and/or physical analysis of them. For this purpose, incineration of an organic material is a technique which has been employed, as a pretreatment, for analyzing inorganic materials, for a long time. Known in the art are a simple method in which a sample in a crucible or a combustion boat is heated at a high temperature, an oxygen bomb method using a pressure-resisting container, an oxygen flask combustion method, a wet type oxidation method, and so forth. In each of these methods, organic materials are subjected to an oxidation decomposition treatment so that the inorganic materials contained in the organic materials can be readily handled. These methods, however, have common disadvantages in that due to the high temperature utilized, there is a tendency of loss of volatile inorganic substances for example, Hg, As and Pb etc.

The low temperature incineration method using oxygen plasma is a distinctive incineration method developed relatively recently, in which an oxygen gas at a low pressure is excited by high frequency and a plasma gas including atom-like oxygen is brought to be in contact with an organic sample so as to oxidize the organic materials. Accordingly, this method is advantageous in that a loss of a very small amount of metallic elements due to volatilization is substantially eliminated and a quantitative analysis can be achieved without contamination from reagents. Accordingly, the low temperature plasma incineration method has been extensively employed as a pretreatment method for atomic light absorption analysis, colorimetry analysis and electrochemical analysis of food, vegetable samples, vital samples, macromolecular samples, medicines, etc.

However, the incineration rate in the low temperature incineration method is lower than those in other methods, and if the sample is not sufficiently dried in advance, the incineration rate will become much lower. For instance, it takes 30–70 hours to incinerate 2–3 grams of dry intestines of a calf with a frequency of 13.56 MHz, a high frequency output 50 Watts and an oxygen flow rate of 10 ml/min. However, if the sample is not dried, it takes two times as long (cf. a Japanese journal, "Analyzing Equipment" 10, 723 (1972) by Tsuji et al). Therefore, it is essential for improving the incineration efficiency that the sample is sufficiently dehydrated before it is incinerated by an incinerating apparatus. Thus, it is very important to develop a method and apparatus in which the dehydration can be effectively carried out.

SUMMARY OF THE INVENTION

Accordingly, an object of the invention is to provide a method in which especially organic materials can be substantially completely sterilized and dehydrated quickly and readily. This object of the invention can be achieved by generating a microwave electromagnetic field with a magnetron in such a manner as to relatively selectively excite the water molecules in a sample.

Another object of the present invention is to provide an apparatus for performing the above method.

A further object of this invention is to provide a method in which the above-described samples such as vital samples are quickly dehydrated by the application of microwave radiation, and succeedingly a low temperature incineration is carried out by using oxygen plasma.

Another object of the present invention is to provide an apparatus for practicing the preceding method.

Another object of the present invention is to provide a safety device for use in the dehydration and incineration apparatus.

In order to achieve the above objects, according to the present invention, a microwave electromagnetic field generated by a magnetron is used to preferentially excite water contained in the sample. That is, in the present invention, the sample is disposed in a microwave electromagnetic field generated in a limited space so that the water content thereof is preferentially excited causing the latter to be removed from the sample. The water content of the sample which may be vaporized is carried by a continuous air flow to an outside of the space and collected continuously. The continuous air supply may be omitted as the case may be. After completion of dehydration, the air supply is terminated and, instead thereof, oxygen is continuously supplied to the space to incinerate the dehydrated sample.

DETAILED DESCRIPTION OF THE EMBODIMENTS

Figure 1:
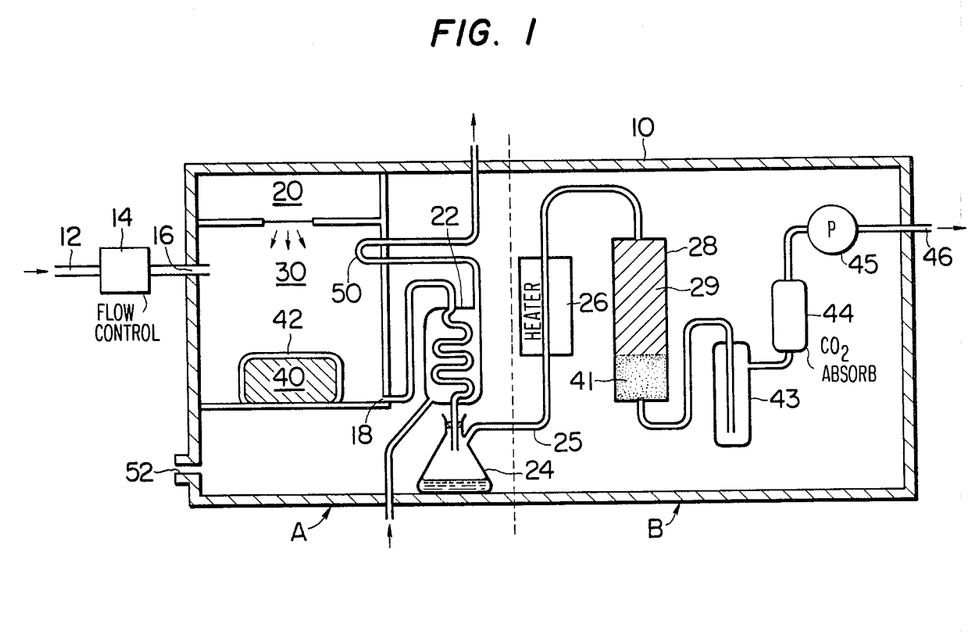
FIG. 1 is a schematic illustration of an embodiment of a microwave dehydration system according to the present invention.

Shown in FIG. 1 is a partially crosssectioned schematic illustration of a preferred embodiment of a dehydration apparatus according to this invention. The apparatus comprises a dehydration section A and a security section B as divided by the dotted line, the security section B being provided as a countermeasure when a sample to be treated thereby includes radioactive materials.

The dehydration section A is made up of a microwave generator 20, a sample accomodating chamber 30 which defines a microwave electromagnetic field generated by the microwave generator, a flow rate control device 14 for supplying air into the chamber 30, a discharging outlet 18 for continuously discharging air from the chamber 30, a cooling unit 22 for cooling gas discharged through the discharging outlet 18, a liquid collecting container 24 for collecting liquid which is obtained by cooling the gas with the cooling unit 22, and a detecting device 50 for detecting a so-called "idling state" after the sample has been dehydrated in the chamber 30. This device 50 can also be used as monitor in a dehydration process, as will be described later.

The security section B is not always necessary for an ordinary dehydration. It is used in the case where a sample to be dehydrated includes radioactive organic materials, so that even a small amount of low molecular radioactive gas which may be present in the liquid collecting container 24 is prevented from escaping out of the system. Accordingly, the security section B comprises a heating device 26 such as an electric furnace for oxidizing a gas from the container 24 to convert organic substances in the gas into water and carbon dioxide, an absorbing device 28 connected to the heating device 26 and containing a moisture absorbing agent 29 such as soda lime or silicagel and an absorbent 41 such as activated carbon, a cold trap 43 for collecting tritium water, a carbon dioxide absorbing device 44 for absorbing $^{14}CO_2$, and a suction pump 45 for drawing gas from the container 24. The cold trap 43 and the carbon dioxide absorbing device 44 may be any conventional ones. However, if a cold trap and a carbon dioxide absorbing device disclosed in Japanese Patent laid open No. 119285/1976 are employed, the objects of the invention can be achieved more effectively. It should be noted that the heating device 26, the cold trap 43 and the carbon dioxide absorbing device 44 may be omitted as the case may be.

The method according to this invention will be described in detail with reference to the case where a radioactive waste of animal is dehydrated with the apparatus shown in the FIG. 1.

Figure 2:
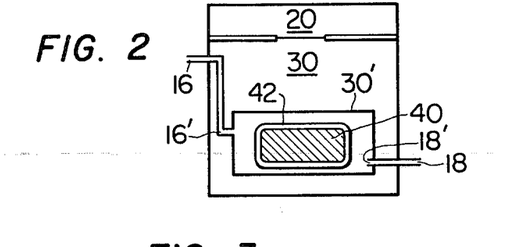
FIG. 2 is a modification of a portion of the system in FIG. 1.

First of all, the waste 40 of the animal is wrapped with a material 42 such as paper or cloth which does not obstruct the passage of steam, and is then placed in the sample accomodating chamber 30 as shown in FIG. 1. Alternatively, the waste of the animal is inserted into a container 30' which is made of a material such as plastic or heat-resisting glass transmissive to microwaves and which, as shown in FIG. 2, comprises an air supplying inlet 16' and discharging outlet 18'. Then the wrapped sample or the container 30' is placed in the chamber 30.

Alternatively, the waste of the animal may be directly placed in the chamber 30 as the case may be.

In any case, the pressure of the chamber 30 is regulated to 20–100 mmHg by a suitable vacuum system and, in this embodiment, the low chamber pressure is given by drawing air in the chamber by means of a vacuum pump 45 which may have a needle valve means.

Air is supplied into the chamber 30 or the container 30'. The air is supplied through a pipe 12 from a suitable air source, and the flow rate of the air is controlled by a flow rate control device 14 provided in the path of the air. This control operation is necessary for effecting the drawing of the water which has been taken out of the waste of the animal placed in chamber 30 or the container 30' through the discharging outlet 18 as described later.

Under these conditions, the microwave generator 20 comprising, for instance, a magnetron, is operated to place the waste of animal 40 in the microwave electromagnetic field, whereupon the water molecules in the waste of animal 40 are selectively excited to produce steam. This steam is quickly introduced into the cooling unit 22 with the aid of the air supplied, where it is liquefied and is then collected in the collecting device 24. The quick removal of the steam out of the chamber 30 is extremely necessary for an effective dehydration of the waste of the animal. For this purpose, the aforementioned flow rate control is carried out.

A part of low molecular compounds such as fats included in the waste of the animal may sometimes be allowed to flow into the cooling unit 22 by steam distillation. This is also collected by the collecting device 24 simultaneously.

A trouble caused frequently by dehydrating waste animals in this way is a stink. Furthermore, if waste animals include radioactive materials, the provision of an effective countermeasure is required so as not to allow the radioactive materials to escape out of the system in view of security.

To this end, in the present invention, the gas possibly existing in the collecting device 24 is drawn through a pipe 25 into the heating device 26 which contains an oxidizing catalyst such as copper oxide to oxidize the gas completely. Water, carbon dioxide, etc., obtained after the oxidation are absorbed and removed by the absorbing device 28.

Even if the waste of the animal includes radioactive materials, especially $^3H$ and $^{14}C$, almost all of them are detained in the system by the use of the absorbing device 28. In order to further assure the security, a radioactivity monitor comprising the cold trap 43 connected to the absorbing device 28, and the carbon dioxide absorbing device 44 are provided. By the use of this radioactivity monitor, the escape of tritum water and $^{14}CO_2$ can be prevented.

As was described before, the water molecules in the sample are selectively excited by the use of the microwave energy to thereby draw water from the sample in the form of steam. In this case, the maximum temperature of the sample may be around 100° C. and, therefore, the organic material will scarcely be decomposed.

As was described, relatively low molecular organic materials are sometimes collected in the collecting device 24 as solvents in water, and radioactive materials are sometimes included in the organic materials. In this case, the solvents are extracted from the collected water by using ether or hexane, so that the organic materials are solely removed and are discarded as they are. Alternatively, if the solvents are absorbed by activated carbon, it may be treated as a combustible waste matter together with the activated carbon. In addition, the material absorbed in the absorbing device 28 can be treated as a solid waste material.

When the microwave heating treatment is applied to a sample which includes no water content or which has been completely dehydrated, the microwave energy is substantially not absorbed thereby. As a result, the microwave energy is accumulated in the chamber, and finally it may cause an electric discharge phenomenon. Therefore, in this invention, this drawback is overcome by using a pipe transmissive to microwaves into which water is allowed to flow.

In the apparatus shown in FIG. 1, the aforementioned pipe is a U-shaped pipe 50 into which the water coolant used in the cooling device 22 is directly supplied. In this arrangement, upon completion of the dehydration of the sample, the temperature of the water in the pipe 50 is abruptly increased. Therefore, the process of dehydration can be monitored by detecting the increase of the water temperature.

In the case where the apparatus is used for dehydration of radioactive waste samples, the leakage of radioactivity from the radioactive waste samples out of the system can be substantially prevented. However, in the invention, the possibility of allowing the radioactive materials to leak out of the system is completely eliminated by keeping the apparatus under reduced pressure. More specifically, the apparatus is placed in a housing 10 which is completely sealed except for an air supplying inlet 16, an exhaust outlet 46, and a water supplying and discharging system. This housing is maintained under reduced pressure by discharging the air therein through an air discharging outlet 52 connected to a suitable pump.

If the waste sample 40, is placed in the container 30' in advance as shown in FIG. 2, the prevention of the escape of radioactive materials can be carried out more effectively. This container 30' should be transmissive to electromagnetic waves and withstand the steam temperature. It is preferable that the container can be compressed together with the waste sample after the latter is dehydrated, so as to facilitate the preservation. For this purpose, in view of the final treatment (burning it by a specified authority), it is preferable that the container is made of plastic such as polyolefine which produces no hazardous gas when burnt.

EXAMPLE 1

An animal tissue (pork) of 180 g was dehydrated by using a microwave heating device whose frequency and output are 2500 MHz and 450 W, respectively. The dehydration was made to 110 g in 15 minutes. This was the complete dehydration of the animal tissue. The animal tissue dehydrated was kept in a vinyl bag for one month. No decomposition was observed with the animal tissue thus kept; that is, the tissue was stable. During the dehydration, no stink was produced at all, and no leakage of radioactive materials was observed at all.

EXAMPLE 2

Under the same condition as those in Example 1, fish of 150 g was treated for 15 minutes, and the complete dehydration of 110 g was carried out. The fish dehydrated was kept in a vinyl bag for one month, but no decomposition was observed; that is, the fish thus treated was stable. Furthermore, the production of stink and the leakage of radioactive materials were not observed at all.

In the embodiments described hereinbefore, the completion of the dehydration is detected as sudden increase of temperature of water passing through the water pipe 50, upon which the operation of the microwave generator may be terminated manually. It has been found, however, that, when the termination of the microwave is delayed for even a very short time after the completion of dehydration, polar substances such as fat etc., contained in the sample material absorb the microwave energy continuously, causing the temperature thereof to be abruptly raised. Since the sample material is usually enclosed by a plastic film or a plastic container for subsequent handling of the dehydrated sample, the film or the container per se may be damaged, making the handling thereof at least very difficult. In this point of view, the operation of the microwave energy source should be terminated not manually but automatically immediately after the completion of dehydration of the sample.

Figure 3:
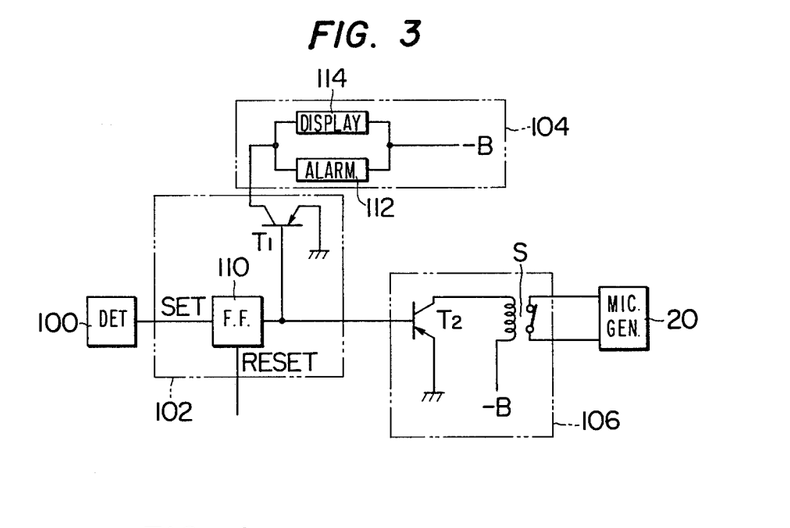
FIG. 3 is a schematic circuit diagram usable to control an operation of a microwave generator in the dehydration system in FIG. 1 when the dehydration is completed.

FIG. 3 is a block circuit diagram of an automatic control device for controlling the operation of the microwave energy source upon a detection of the completion of dehydration.

In FIG. 3 numeral 100 represents the detector formed by using the water pipe 50 in FIG. 1 or other type detectors such as to be disposed in a vapor pipe portion extending from the exhaust port 18 to the cooling device 22, either of which is adapted to detect the completion of dehydration.

For the detector 100 using the water pipe 50, it detects an abrupt increase of the temperature in the container 30 and, for the detector using the vapor pipe portion, it detects an abrupt reduction of vapor pressure.

The detector 100 constituted with, for example, the water pipe 50 and temperature sensitive elements provides an output indicating the completion of dehydration which is supplied to a control circuit 102. Upon the receipt of the output detection signal, the control circuit 102 provides a control signal which is supplied to a display device 104 and an automatic termination device 106. the circuit construction of the control circuit 102 may be desirably designed. For example, it may be constructed with a bistable multivibrator, or flip-flop 110 which is set by the detection signal from the detector and a switch $T_1$ which turns on in response to an output of the multi vibrator 110 as shown in FIG. 3.

The display device 104 may be constituted with a suitable alarm device 112 and/or a display 114 as shown in FIG. 3.

The automatic termination device 106 may be constituted with a switch $T_2$ which turns on in response to the output signal from the control circuit 102 and a normally closed switch S which is opened upon the turning on of the switch $T_2$ as shown in FIG. 3.

The detector may be any provided that it can detect a change in dehydration stage and provide an output upon the completion of dehydration, as mentioned previously.

Figure 4:
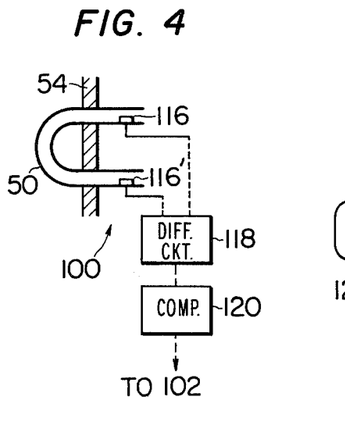
FIGS. 4 to 9 show examples of a dehydration detector in FIG. 1, respectively.

FIG. 4 shows the detector 100 which uses the water pipe 50.

In FIG. 4, a pair of temperature sensitive elements 116 and 116′ are disposed in the inlet and outlet of the U-shaped water pipe 50. As is well known, the temperature of water supplied to the water pipe 50 is not always constant. Therefore, in the arrangement in FIG. 4, output signals from the elements 116 and 116′ are supplied to a differential circuit 118 to obtain a difference between the output signals and the difference is compared in a comparator 120 with a predetermined reference value. When the difference value exceeds the reference value, the comparator 120 provides an output which is supplied to the control device 102. In this way, the variation of the temperature of water supplied to the water pipe is compensated. That is, in FIG. 3, the bistable multivibrator 110 is set in response to the output of the comparator 120 to provide a high signal which is applied to the switch $T_1$ and the automatic termination device $T_2$ to turn the latter two devices on to thereby render the display device 104 operative and the switch S open. Consequently, the operation of the microwave generator 20 is terminated. In this case, when the bistable multivibrator is in the set state, the microwave generator is in its rest state. Therefore, the flip-flop may be reset either manually or automatically with a suitable means to re-start the operation of the microwave generator in a subsequent dehydration process.

Figure 5:
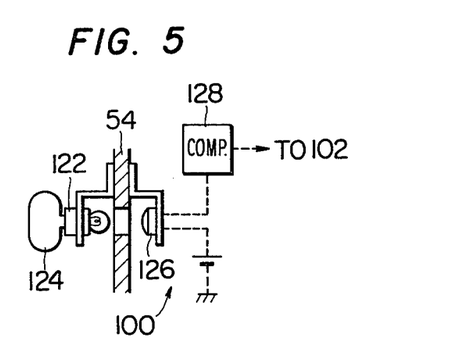

FIG. 5 shows another example of the dehydration completion detector in which a portion of a side wall 54 of the container 30 is made transparent and in which a photo-emissive element 122 is suitably supported in the container so as to face to the transparent window and a light receiving element 126 such as photo-diode provided outside of the container at a corresponding position to the photo-emissive element. The photo-emissive element 122, usable in this example, is of the type capable of changing the light amount emitted thereby according to the electromagnetic field intensity in the chamber 30. The electromagnetic energy may be picked up by a ring antenna 124 connected to the photo-emissive element 122. The output of the photo-diode 126 is supplied to a comparator 128 where it is compared with a suitable reference value. When the output of the photo-diode 126 exceeds the reference value, the comparator provides an output which is supplied to the control circuit 102.

Figure 6:
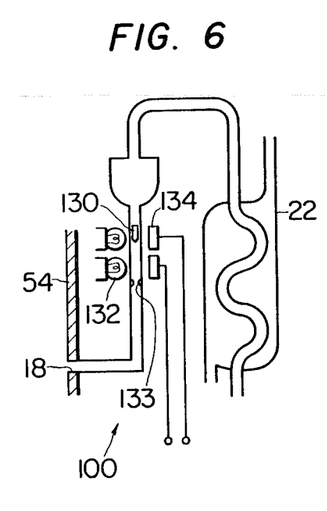
Figure 7:
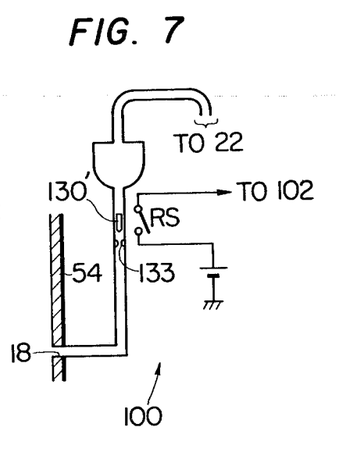
Figure 8:
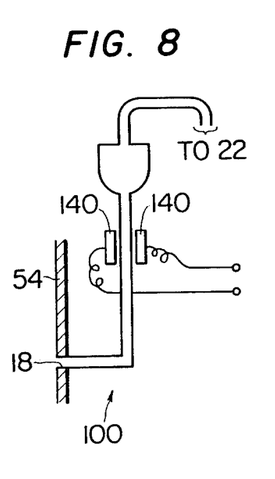

FIGS. 6, 7 and 8 show other examples of the detector 100 which uses the variation of the vapor amount discharged through the outlet port 18 of the container 30, respectively. In FIG. 6, a suitable float 130 is disposed in the vapor passage and a plurality of light sources 132 and a corresponding number of light receiving elements 134 are disposed in the both sides of the passage, respectively, so that the light receiving elements 134 receive lights emitted by the light sources 132 and passed through the passage.

The float 130 will move downwardly when the dehydration proceeds and the amount of water vapor reduces. Therefore, the float may block the light or open the light passes depending upon the initial position of the float and the blocking on the opening of the light pass thereby is detected by the light receiving elements.

In FIG. 7, a float 130′ of magnetic material is used in the vapor passage as in the example in FIG. 6 and the position of the float 130′ in the passage is detected by means of a magnetic device. For example, when the float 130′ is a magnet, it may be possible to use a magnetic relay switch RS disposed outside the passage tube.

In FIG. 8, a pair of high frequency electrodes 140 are disposed in both sides of the vapor passage. That is, the variation of the vapor amount passing through the vapor passage tube is detected as a variation of capacity between the electrodes.

Figure 9:
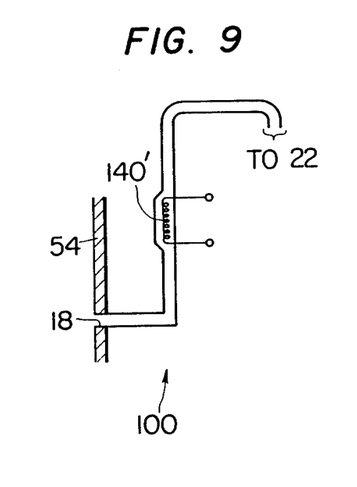

In FIG. 9, an electric resistance element 140′ is disposed in the vapor passage tube. In this case the variation of the vapor amount is detected as a variation of temperature and hence a variation of the resistance.

Figure 10:
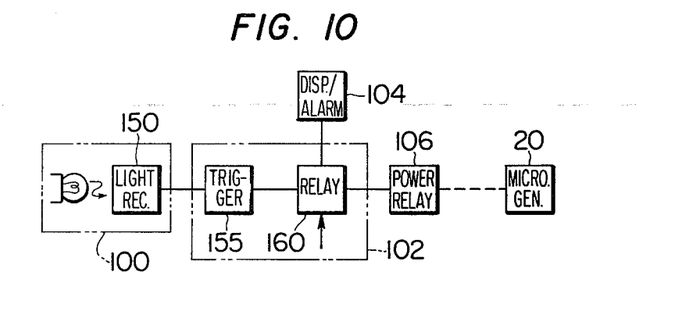
FIGS. 10 to 12 are other examples of the control circuit diagram for the microwave generator, respectively.

FIG. 10 shows a circuit diagram in block, which may be effectively used with the detector shown in FIG. 5. The output of the detector 100 including a light receiving element 150 such as CdS is wave-shaped by a Schmitt trigger circuit 155 and supplied to a relay circuit 160 which has a holding circuit. The output of the relay circuit 160 actuates the display-alarm device 104. The output of the relay circuit is also supplied to a power relay 106 to control the operation of the microwave generator 20. A reset signal to be applied to the relay circuit 160 may be provided manually or automatically by a suitable means.

Figure 11:
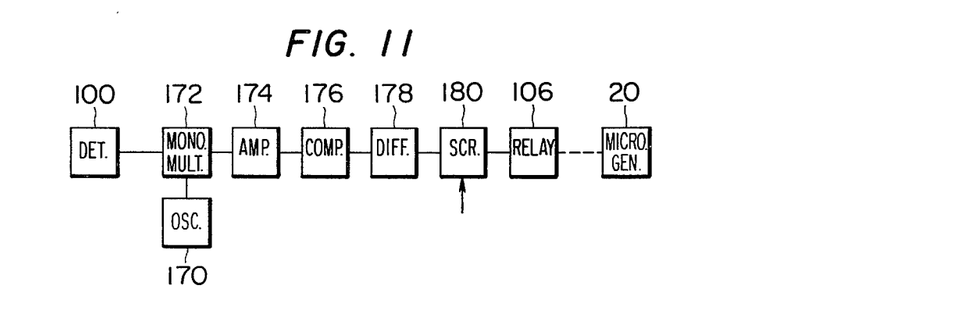

FIG. 11 shows a block circuit diagram which is effective for use with the detector shown in FIG. 8. As mentioned previously, the detector 100 in FIG. 8 is one constituted with a pair of the high frequency electrodes which are connected to a monostable multivibrator 172. The signal picked up by the high frequency electrode is capacitance-voltage converted by the multivibrator 172. The monostable multivibrator is controlled by an output of an oscillator 170 which produces a considerably high frequency. The output of the monostable multivibrator 172 is amplified by an amplifier 174 and then compared with a suitable reference voltage in a comparator 176. The latter provides an output when the amplified high frequency exceeds the reference voltage and the output is supplied to a differential circuit 178. The output of the differential circuit is applied to an SCR 180 whose output is utilized to actuate the relay circuit 106 to thereby stop the operation of the microwave generator 20.

The resetting of this circuit may be performed by applying a reset signal to the SCR 180 manually or automatically using a suitable means.

Figure 12:
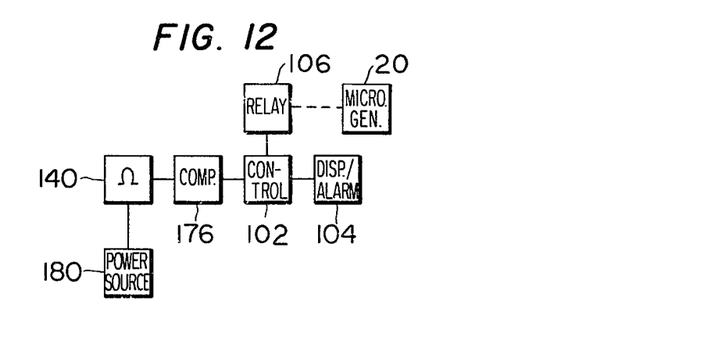

FIG. 12 is an example of circuit which may be effective for use with the detector shown in FIG. 9.

The resistor element 140 is previously heated to a constant temperature by supplying thereto a constant current from a stabilized power source 180 and further heated according to the temperature of the water vapor flowing through the pipe. The temperature variation of the water vapor causes the resistance of the resistor element 140 to change. The change in resistance is converted by, for example, a bridge circuit into a voltage variation which is compared by a voltage comparator 176. The output of the comparator 176 is used to actuate a relay drive circuit 106 whereby operation of the microwave generator 20 is terminated.

As mentioned hereinbefore, since, according to the present invention, the operation of the microwave generator 20 can be terminated immediately after the completion of dehydration of the sample, the microwave energy absorption of other polar substances than water contained in the sample is effectively prevented from occurring. This may be particularly advantageous when the sample contains radioactive substances.

Figure 13:
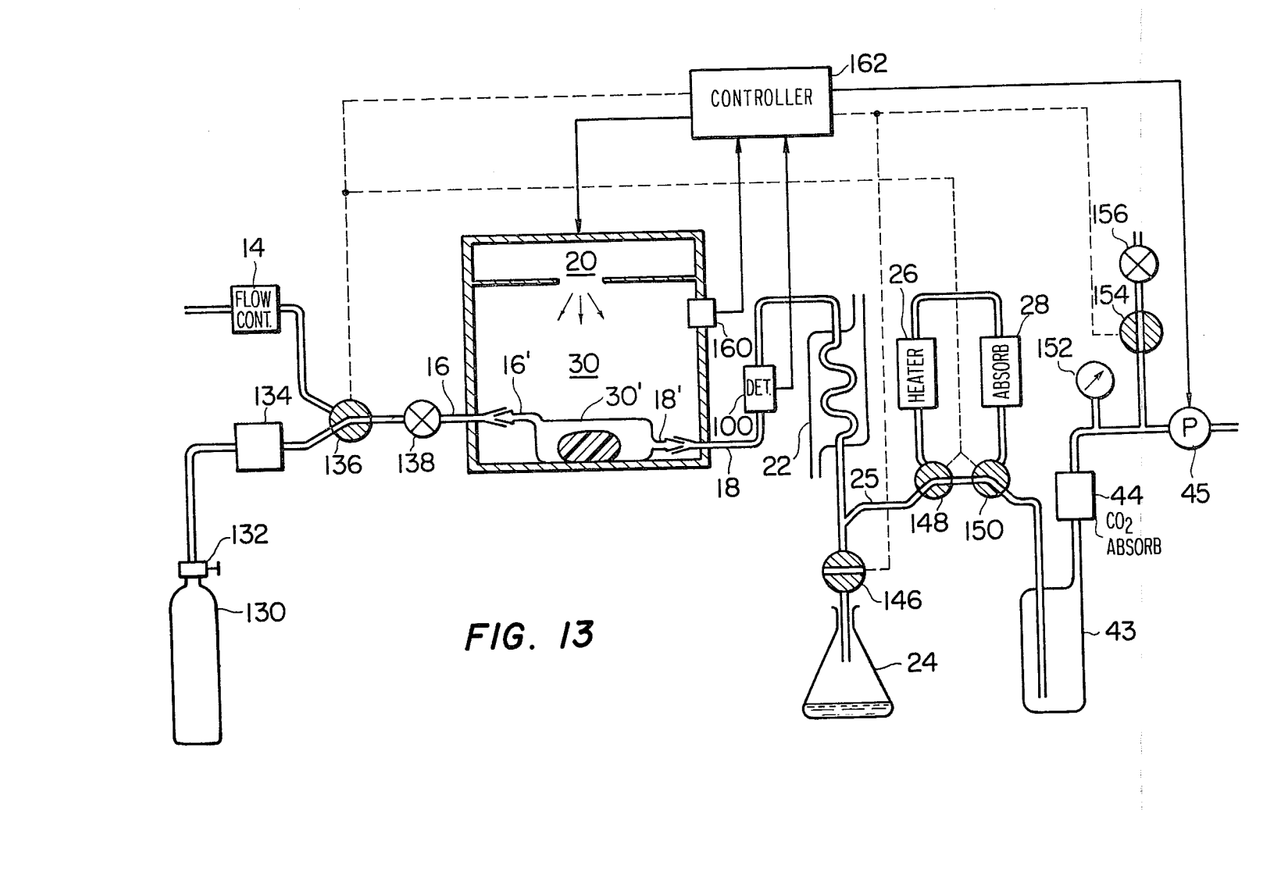
FIG. 13 is a schematic illustration of another embodiment of the microwave dehydration system according to the present invention, in which an incineration of a sample can be performed automatically after the sample is dehydrated.

FIG. 13 shows another embodiment of the present invention by which the sample can be dehydrated and subsequently incinerated automatically.

In FIG. 13, the same components as those in FIG. 1 are designated by the same reference numerals. Newly added are an electromagnetic three-way cock 136 for selectively supplying air and oxygen to the container 30' a needle valve 138 for regulating an oxygen supply rate, an electromagnetic on-off valve 146 for cutting the water collecting device 24 off when the dehydration is completed, a pair of electromagnetic three-way cockes 148 and 150 for by-passing the heating device 26 and the absorbing device 28 during an incineration process, an electromagnetic on-off valve 154 and a needle valve 156 for regulating the system pressure to a predetermined valve during the incineration process, a pressure gauge 152, an incineration detector 160 for detecting a completion of incineration and a controller 162.

In this embodiment, the container 30' may be of a material such as glass capable of withstanding a relatively high temperature to be encounted during the incineration of the sample dehydrated in the manner previously mentioned with reference to FIG. 1. It is also noted in this embodiment that the completion of dehydration is detected by a detector such as shown in any of FIGS. 6 to 9 although any other detectors may also be used effectively.

Each of the three-way cocks 136, 148 and 150 is normally biased to a dehydration position and the valves 146 and 154 are normally opened and closed, respectively, so that a dehydration path shown in FIG. 1 is established.

As mentioned previously, the completion of dehydration is detected by the dehydration detector 100. The output of the dehydration detector 100, indicating the completion of dehydration, is supplied to the controller 162.

Figure 14:
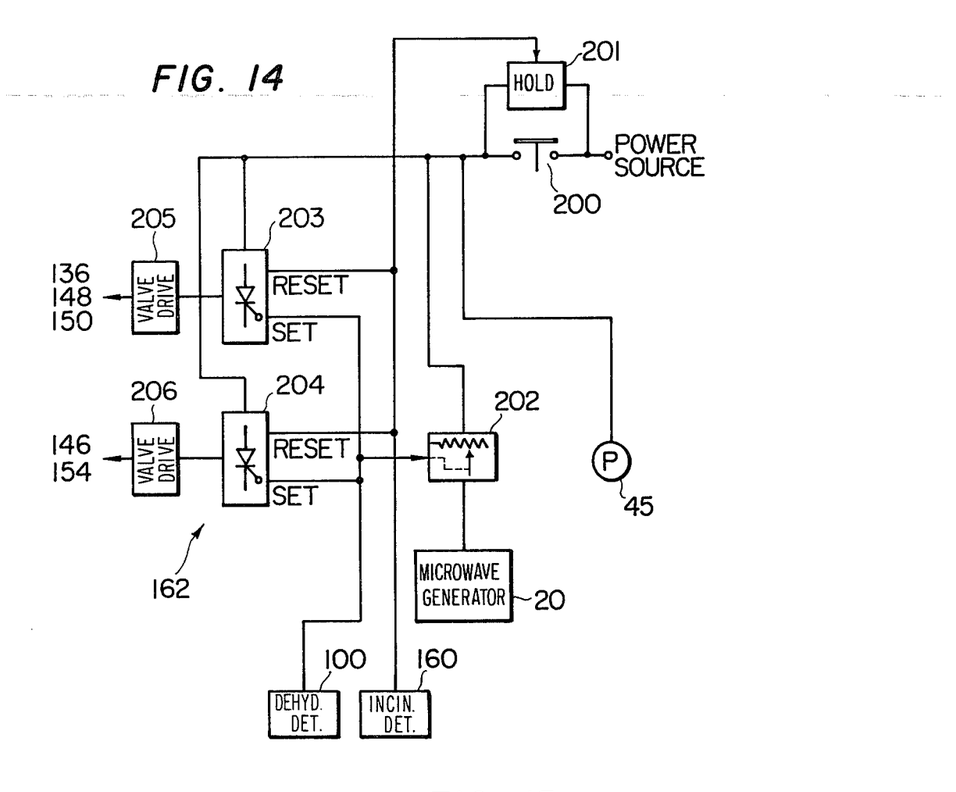
FIG. 14 is an example of a control circuit for the embodiment in FIG. 13.

FIG. 14 shows an example of circuit construction of the controller 162. The controller 162 is composed of a normally open main switch 200 provided with a holding circuit 201 which, once the main switch 200 is closed manually, holds the switch 200 closed until a reset signal is applied thereto, a three-way cock control device 203, an on-off valve control device 204, a three-way cock drive device 205, an on-off valve drive device 206 and a microwave control device 202 of the microwave generator 20.

Each of the control devices 203 and 204 has a set input, a reset input, a power input and a power output connected to the associated drive device.

Upon depression of the main switch 200, an electric power is supplied to the pump 45 and to the microwave generator 20 through the microwave control device 202 to cause air to flow through the container 30' and to establish a microwave field in the chamber 30. In general, the microwave field strength required for dehydration is greater than that required for low-temperature incineration. Therefore, it is preferable to provide the device 202 which operates to automatically decrease the output of the microwave generator 20 in response to the output signal of the dehydration detector 100.

The completion of dehydration is detected by the detector 100 as mentioned previously to provide the output indecating the latter.

The output of the dehydration detector 100 is supplied to set inputs of the control devices 203 and 204. Upon receipt of the output of the detector 100, the control devices 203 and 204 provide drive outputs and actuate the respective drive devices 205 and 206 to turn the three-way cocks 136, 148 and 150 by 120° and the on-off valves 146 and 154 off and on, respectively, to establish an incineration path shown in FIG. 13. With the valve 146 closed, any gas which possibly exists in the water collecting device 24 is prevented from coming into the incineration path and, with the valve 154 closed, the pressure in the path is regulated by the needle valve 156 to a pressure in the order of 1–10 mmHg which is suitable to maintain oxygen plasma in the container 30'. Since control mechanisms of the cocks and the valves per se are well known in the art, details thereof should not be required.

In any event, it will be clear that FIG. 13 shows a state after the sample in the container 30' is completed and the incineration process for the dehydrated sample is just started upon the turnings of the cocks 136, 148 and 150 and the valves 146 and 154 due to the detection of the completion of dehydration by the dehydration detector 100. At this state, oxygen is supplied from the oxygen source 130 through a flow rate regulator 134 into the container 30'.

Oxygen supplied to the container 30' under microwave radiator forms a low temperature plasma to oxidize the dehydrated sample.

The incineration process is detected by the incineration detector 160. In this embodiment, the detector 160 detects the blue color of CO plasma generated by incineration process. Therefore the completion of incineration is detected by the extinction of the plasma light.

The output of the incineration detector 160 which is produced by detecting the extinction of the blue light is connected to the reset inputs of the control devices 203 and 204 to terminate the power supplys to the drive devices 205 and 206. The output of the incineration detector 160 is also connected to the holding circuit 201 of the main switch 200 to release it to thereby terminate the power supply to the microwave generator 20 and the pump 45.

In a case where the microwave field strength during the incineration is high such as in a case where the microwave control device 202 is omitted, then the plasma intensity and the incineration rate are both increased resulting in an increase of the sample temperature. Therefore, in this case, volatile inorganic materials are liable to be lost.

Figure 15:
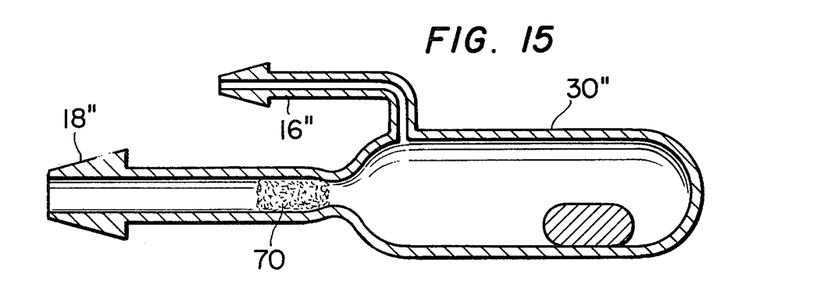
FIG. 15 is an example of a sample container useful particularly in the embodiment in FIG. 13.

However, the recovery of such inorganic materials can be improved by the utilization of a sample container 30″ as shown in FIG. 15. More specifically, plasma discharge is caused in a part of the sample container 30″, and the temperature of the sample is raised according to the strength of the plasma discharge. However, if the outlet 18′ shown in FIG. 13 is modified into an outlet 18″ having a neck as shown in FIG. 15, and quartz cotton 70 impregnated with suitable absorbing material is inserted in the neck, no plasma discharge is caused in this part. Therefore, even if the temperature of the sample is raised and the volatile inorganic materials thereof reach this neck portion, they can be readily collected.

If in the case of subjecting the sample incinerated to analysis, the sample and the quartz cotton are subjected to ash content dissolution treatment, the recovery of the inorganic materials can be improved. As is apparent from the above description, one of the features of the plasma incineration method resides in that the vicinity of the heat generating section is maintained at a low temperature.

What is claimed is:

1. A dehydration method comprising the steps of disposing a sample to be dehydrated in a container having an inlet and an outlet and transmissive to microwaves, supplying air to said container at a suitable flow rate so that a substantially constant carrier air flow is established through said container to enhance the escape of water vapor from said container, and introducing a microwave electromagnetic field into said container so that water molecules in said sample are selectively excited to produce a gaseous mixture containing water.

2. A dehydration method as claimed in claim 1 further comprising the step of cooling said mixture to liquefy the water content of said gaseous mixture flown out from said outlet of said container.

3. A dehydration method as claimed in claim 2, further comprising the steps of: oxidizing the remaining gaseous substances after said cooling step of said gaseous mixture to convert the remaining gaseous substances into water and carbon dioxide, and absorbing products other than water and carbon dioxide resulting from said oxidizing step.

4. A dehydration method as claimed in claim 3, further comprising the step of cold-trapping the water resulting from said oxidizing step.

5. A dehydration method as claimed in claim 4, further comprising the step of absorbing the carbon dioxide resulting from said oxidizing after said cold trapping.

6. A dehydration method as claimed in claim 1, further comprising the steps of detecting a completion of dehydration of said sample; placing said dehydrated sample in an oxygen atmosphere at suitable pressure to produce and sustain low temperature oxygen plasma around said dehydrated sample in response to the detection of the dehydration completion; and stopping said microwave radiation upon detection of a completion of incineration of said dehydrated sample.

7. A dehydration method as claimed in claim 6, further comprising the step of reducing the strength of said microwave radiation upon detection of the completion of dehydration of said sample.

8. A dehydration apparatus comprising a first container of material suitable to confine an electromagnetic field therein and having an air supplying inlet, an air discharging outlet and room enough to accommodate a sample to be dehydrated; an air supplying device connected to said air supplying inlet of said first container; a second container of material transmissive to microwave energy and having an inlet connected to said air supplying inlet of said first container and an outlet connected to said air discharging outlet of said first container so that a substantially continuous flow of carrier air may be maintained through said second container in order to enhance the escape of water vapor from said second container, said second container being disposed in said first container, and a microwave generating means for generating a microwave electromagnetic field in said first container.

9. A dehydration apparatus as claimed in claim 8, further comprising cooling means for cooling a gaseous mixture from said air discharging outlet of said first container; and collecting means for collecting water liquefied by said cooling means.

10. A dehydration apparatus as claimed in claim 8, further comprising means for detecting a completion of dehydration of said sample.

11. A dehydration apparatus as claimed in claim 8, further comprising oxidizing means for oxidizing a gaseous mixture passed through said cooling means and an absorbing means for absorbing materials contained in said gaseous mixture past through said cooling means, other than water and carbon dioxide.

12. A dehydration apparatus as claimed in claim 11, comprising means for monitoring tritium and/or $^{14}C$ in the gaseous mixture from said absorbing means.

13. A dehydration apparatus as claimed in claim 12, further comprising a third container for enclosing at least said second container and said cooling means to prevent tritium and/or $^{14}C$ from leaking.

14. A dehydration apparatus as claimed in claim 8, wherein said second container is made of a material which can be molded by compression.

15. A dehydration apparatus as claimed in claim 8, further comprising a flow rate control device for regulating the air supply rate of said air supplying device.

16. A dehydration apparatus as claimed in claim 10, wherein said means for detecting a completion of dehydration comprises a detecting means for detecting an abrupt increase of microwave electromagnetic field intensity in said first container and further comprising a control circuit responsive to an output signal of said detecting means to provide a control signal, an indication means responsive to said control signal to indicate the abrupt increase of the microwave electromagnetic field intensity in said first container and means responsive to said control signal to cease an operation of said microwave generator.

17. A dehydration apparatus as claimed in claim 16, wherein said detecting means comprises a water tube having at least a portion passing through said first container and means responsive to a temperature of water flowing through said water tube for providing an output when the water temperature exceeds a predetermined value.

18. A dehydration apparatus as claimed in claim 16, wherein said detecting means comprises a light emissive element disposed in said first container and responsive to a predetermined intensity of the microwave electromagnetic field in said first container to emit a light when the field intensity exceeds a predetermined value and a light responsive element for detecting the light emitted by said light emissive element.

19. A dehydration apparatus as claimed in claim 16, wherein said detecting means comprises a transparent tube connected between said outlet port of said first container and said cooling device, a float element disposed in said transparent tube and held in a position by a gas pressure flowing through said transparent tube, at least one light source disposed in a position outside said transparent tube and at least one light sensitive element disposed in an opposite position outside said transparent tube so that a light passage is formed through said transparent tube and between said light source and said light sensitive element and so that, upon an abrupt decrease of the amount of gas passing through said tube, said float is lowered to change the light passing condition between said light source and said light sensitive element to provide a signal indicating the abrupt decrease of the amount of water vapor.

20. A dehydration apparatus as claimed in claim 16, including a tube of non-magnetic material, wherein said detecting means comprises said tube connecting between said outlet of said first container and said cooling device, a member including a magnetic portion adapted to be inserted into and held normally at a stationary position in said non-magnetic tube and a magnetic sensitive means disposed outside said non-magnetic tube and responsive to a predetermined shift of said member to provide an output indicating the predetermined shift.

21. A dehydration apparatus as claimed in claim 20, wherein said member is a magnet and said magnetic sensitive means is a relay switch.

22. A dehydration apparatus as claimed in claim 16, wherein said detecting means comprises a tube of dielectric material, said tube connecting between said inlet port of said first container and said cooling device, a pair of high frequency electrodes disposed outside of said dielectric tube oppositely to each other and a circuit means responsive to a predetermined change of a capacitance provided between said high frequency electrodes to provide an output indicating the capacitance change.

23. A dehydration apparatus as claimed in claim 16, wherein said detecting means comprises an electrically insulating tube, an electric resistance member and a circuit means responsive to a predetermined change of the resistance of said resistance member to provide an output indicating the change.

24. A dehydration apparatus as claimed in claim 10, further comprising a low pressure means for maintaining the pressure in said second container low enough to sustain a low temperature oxygen plasma in said second container when oxygen at a suitable pressure is supplied thereto, means for supplying oxygen to said second container; a switching means for connecting said oxygen supplying means to said second container and for disconnecting said water collecting means in response to an output of said detecting means for detecting a completion of dehydration of said sample.

25. A dehydration apparatus as claimed in claim 24, further comprising an incineration detector responsive to a completion of incineration, for producing an output signal, and a control means responsive to said output signal of said incineration detector to terminate operating of said microwave generating means and said low pressure means and to deenergize said switching means.

26. A dehydration apparatus as claimed in claim 25, further comprising means responsive to said output of said detecting means for detecting the completion of dehydration of said sample to reduce the output of said microwave generating means.

27. An apparatus for dehydrating and incinerating a dehydrating sample as claimed in claim 24, wherein said second container comprises a sample accommodating section; an inlet member selectingly connectable to said oxygen supplying means and to said air supplying means; a neck section connected to said low pressure means; and quartz cotton inserted into said neck section.

* * * * *